US010909686B2

(12) United States Patent
Ho

(10) Patent No.: US 10,909,686 B2
(45) Date of Patent: Feb. 2, 2021

(54) IDENTIFYING AND EXTRACTING A SUB-IMAGE IN A DOCUMENT IMAGE FILE

(71) Applicant: International Business Machines Corporation, Armonk, NY (US)

(72) Inventor: Mang-Rong Ho, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 16/203,103

(22) Filed: Nov. 28, 2018

(65) Prior Publication Data

US 2020/0167932 A1  May 28, 2020

(51) Int. Cl.
| | |
|---|---|
| *G06T 7/00* | (2017.01) |
| *G06T 7/10* | (2017.01) |
| *G06T 7/187* | (2017.01) |
| *G06T 7/13* | (2017.01) |
| *G06K 9/00* | (2006.01) |
| *G06T 7/90* | (2017.01) |

(52) U.S. Cl.
CPC ............ *G06T 7/13* (2017.01); *G06K 9/00483* (2013.01); *G06T 7/90* (2017.01)

(58) Field of Classification Search
USPC ......... 358/1.1–3.29, 512–540; 382/100, 103, 382/162–224, 254–284; 399/1–6, 38–54; 715/200–204, 209, 228, 255, 277
See application file for complete search history.

(56) References Cited

U.S. PATENT DOCUMENTS

| | | | |
|---|---|---|---|
| 7,796,837 B2* | 9/2010 | Lueck ................. | G06F 16/9577 382/286 |
| 8,509,534 B2 | 8/2013 | Galic et al. | |
| 8,818,099 B2 | 8/2014 | Tian | |
| 2006/0110026 A1* | 5/2006 | Strassenburg-Kleciak ................. | G01S 17/89 382/154 |
| 2011/0222769 A1 | 9/2011 | Galic et al. | |
| 2014/0072219 A1 | 3/2014 | Tian | |

(Continued)

OTHER PUBLICATIONS

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

(Continued)

*Primary Examiner* — Marcellus J Augustin
(74) *Attorney, Agent, or Firm* — Konrad Raynes Davda & Victor LLP; Janaki K. Davda

(57) ABSTRACT

Provided are techniques for identifying and extracting a sub-image in a document image file. Colors in a document image file are modified to form a modified document image file, wherein the document image file contains a first color, a second color, and a third color, wherein a threshold is used to determine whether each of different levels of the third color is to be one of the first color and the second color. Solid horizontal lines and solid vertical lines having one of a pre-defined width and a pre-defined height are removed from the modified document image file. A sub-image in the modified document image file is identified based on remaining solid horizontal lines and remaining solid vertical lines. A segment that includes the sub-image is extracted. Post-processing is performed on the segment.

15 Claims, 13 Drawing Sheets

(56) References Cited

U.S. PATENT DOCUMENTS

2015/0254401 A1* 9/2015 Sankhe .............. H04N 1/00127
                                                    382/132
2018/0012268 A1   1/2018 Simantov et al.
2018/0089533 A1   3/2018 Zagaynov et al.
2018/0293731 A1* 10/2018 Palaniyappan ........... G06T 3/60
2019/0278986 A1* 9/2019 Nepomniachtchi ...... G07C 9/00
2020/0042785 A1* 2/2020 Burdick ............. G06K 9/00449

OTHER PUBLICATIONS

Mell, P. and T. Grance, "The NIST Definition of Cloud Computing (Draft)", Sep. 2011, Computer Security Division Information Technology Laboratory National Institute of Standards and Technology, Total 7 pp.

* cited by examiner

IDENTIFYING AND EXTRACTING A SUB-IMAGE IN A DOCUMENT IMAGE FILE

BACKGROUND

1. Field of the Invention

Embodiments of the invention relate to identifying and extracting a sub-image in a document image file.

2. Description of the Related Art

A document image file may be described as a document in an image file format, but the content is a document. For example, a document image file may be a physical document that is scanned by a scanner into an image file format, and this is a document image file. A document image file (e.g., an invoice, a medical claim, a contract, etc.) may contain a company logo or some small images ("sub-images"), in addition to text content.

SUMMARY

In accordance with embodiments, a computer-implemented method is provided for identifying and extracting a sub-image in a document image file. The computer-implemented method comprises operations. Colors in a document image file are modified to form a modified document image file, wherein the document image file contains a first color, a second color, and a third color, wherein a threshold is used to determine whether each of different levels of the third color is to be one of the first color and the second color. Solid horizontal lines and solid vertical lines having one of a pre-defined width and a pre-defined height are removed from the modified document image file. A sub-image in the modified document image file is identified based on remaining solid horizontal lines and remaining solid vertical lines. A segment that includes the sub-image is extracted. Post-processing is performed on the segment.

In accordance with other embodiments, a computer program product is provided for identifying and extracting a sub-image in a document image file. The computer program product comprising a computer readable storage medium having program code embodied therewith, the program code executable by at least one processor to perform operations. Colors in a document image file are modified to form a modified document image file, wherein the document image file contains a first color, a second color, and a third color, wherein a threshold is used to determine whether each of different levels of the third color is to be one of the first color and the second color. Solid horizontal lines and solid vertical lines having one of a pre-defined width and a pre-defined height are removed from the modified document image file. A sub-image in the modified document image file is identified based on remaining solid horizontal lines and remaining solid vertical lines. A segment that includes the sub-image is extracted. Post-processing is performed on the segment.

In yet other embodiments, a computer system is provided for identifying and extracting a sub-image in a document image file. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Colors in a document image file are modified to form a modified document image file, wherein the document image file contains a first color, a second color, and a third color, wherein a threshold is used to determine whether each of different levels of the third color is to be one of the first color and the second color. Solid horizontal lines and solid vertical lines having one of a pre-defined width and a pre-defined height are removed from the modified document image file. A sub-image in the modified document image file is identified based on remaining solid horizontal lines and remaining solid vertical lines. A segment that includes the sub-image is extracted. Post-processing is performed on the segment.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments utilize image processing technologies to identify all non-text areas that may be sub-images or other content (e.g., a table border line). Then, embodiments extract the sub-image.

Figure 1:
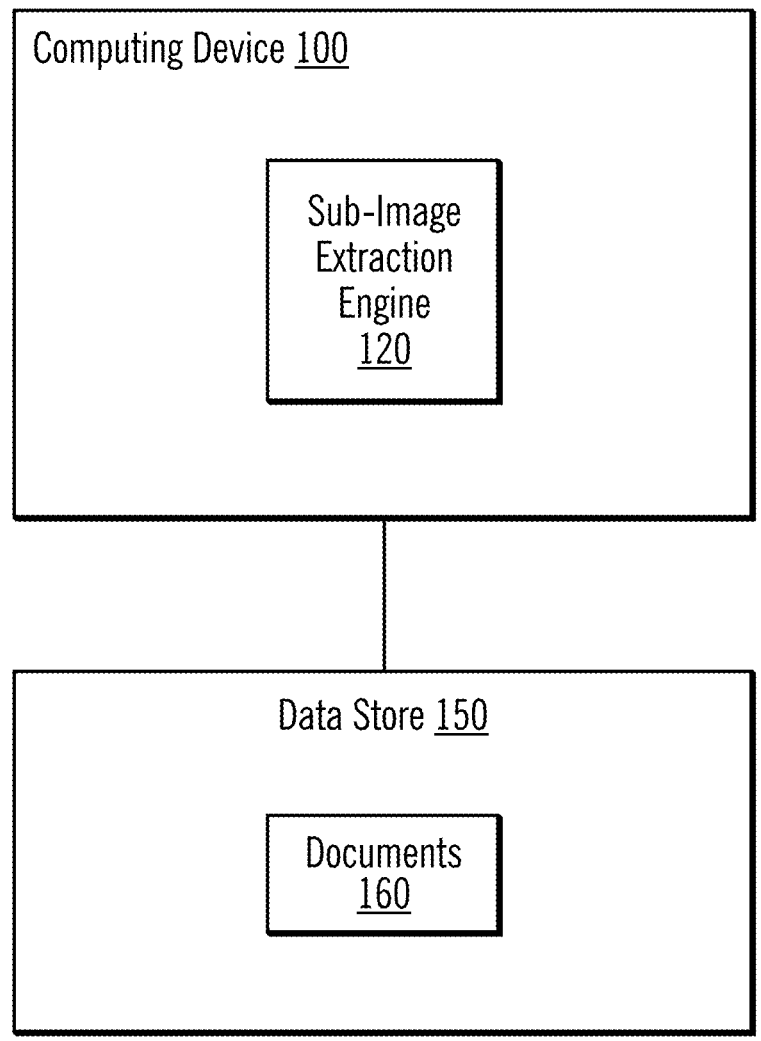
FIG. 1 illustrates, in a block diagram, a computing environment in accordance with certain embodiments.

FIG. 1 illustrates, in a block diagram, a computing environment in accordance with certain embodiments. In FIG. 1, a computing device 100 includes a sub-image extraction engine 120. The computing device 100 is connected to a data store 150 that stores document image files 160.

Figure 2A:
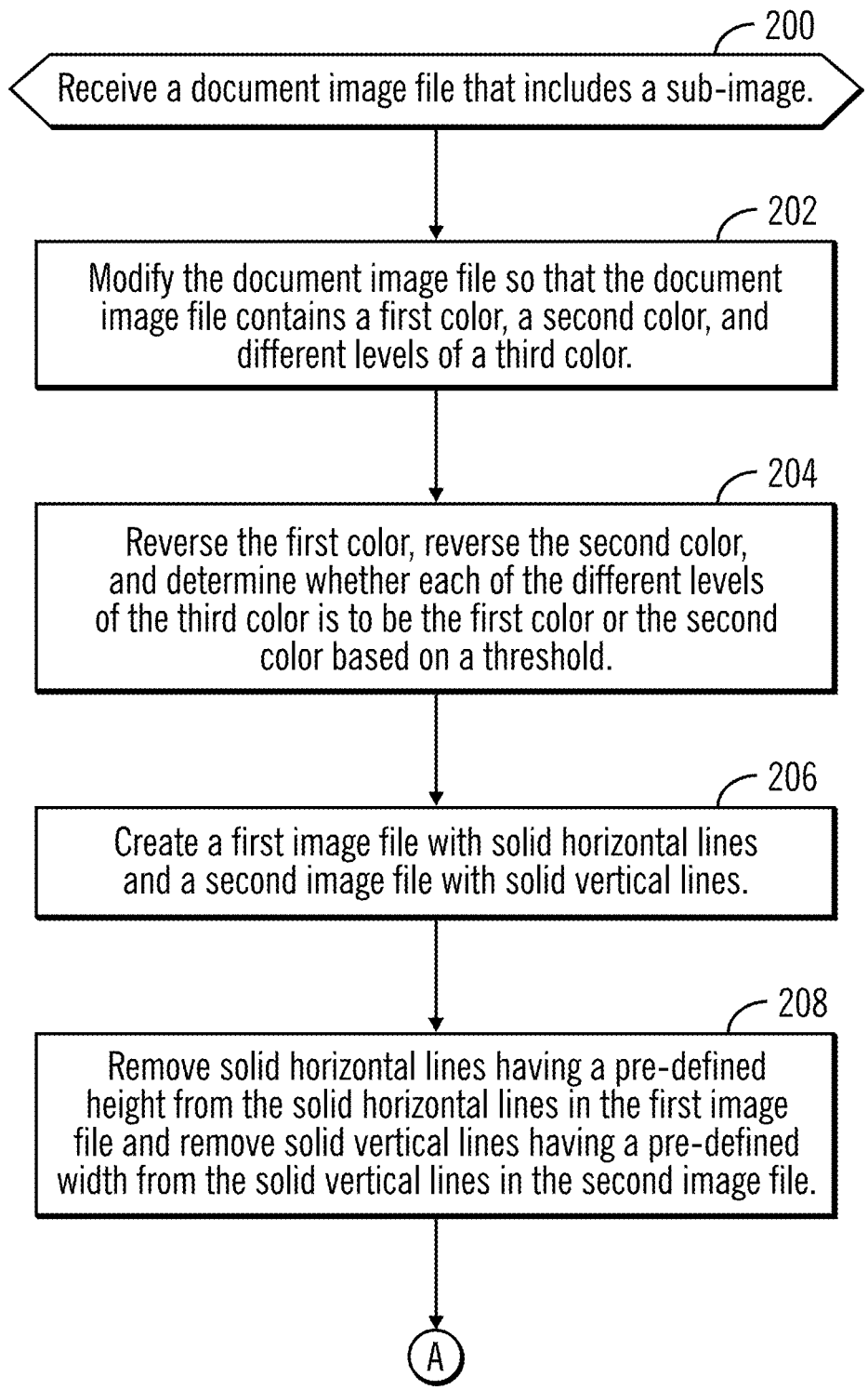
FIGS. 2A and 2B illustrate, in a flowchart, operations for identifying and extracting a sub-image in accordance with certain embodiments.
Figure 2B:
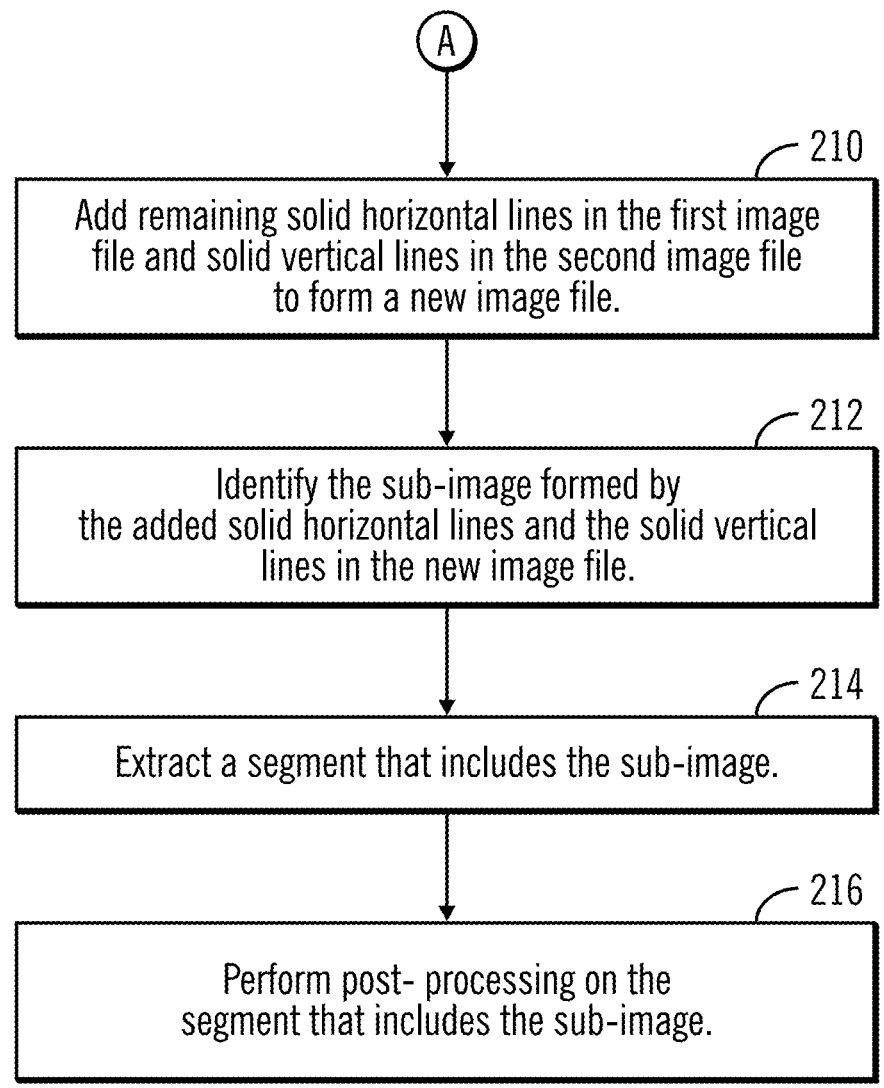

A document image file may include a background and a foreground. The background is a "plain" background. For example, the background may be a color (e.g. white) on which the foreground content is displayed. In certain embodiments, the foreground is any content other than the background color. The foreground may include any combination of: text (made up of dotted lines), one or more sub-images (made up of solid lines exceeding a pre-defined width or a pre-defined height), and one or more solid lines that are not part of the one or more sub-images (e.g., lines used to underline text or form a table or box around that text that are made up of solid lines not exceeding a pre-defined width or a pre-defined height). FIGS. 2A and 2B illustrate, in a flowchart, operations for identifying and extracting a sub-image in accordance with certain embodiments. Control begins at block 200 with the sub-image extraction engine 120 receiving a document image file that includes a sub-image. In block 202, the sub-image extraction engine 120 modifies the document image file so that the document image file contains a first color (e.g., black), a second color (e.g., white), and different levels of a third color (e.g., grey). This is an initial operation for image processing. In certain embodiments, this operation "greys out" the document image file so that the document image file contains the first color, the second color, and different levels of the gray color.

In block 204, the sub-image extraction engine 120 reverses the first color, reverses the second color, and determines whether each of the different levels of the third color is to be the first color or the second color based on a threshold (i.e., a "color" threshold). In certain embodiments, the reversal changes the first color to the second color (e.g., black becomes white), changes the second color to the first color (e.g., white becomes black), and uses the threshold to determine whether each of the different levels of the third color is to be the first color or the second color. For example, if the third color is grey, and a grey level exceeds a threshold for grey color (i.e., the grey level is more grey than other grey levels or is closer in shade to black), the grey level becomes white. With this example, if the grey level does not exceed the threshold for grey color (i.e., the grey level is less grey than other gray levels or is closer in shade to white), then the grey level becomes black. In certain embodiments, the threshold ("color" threshold) is configurable. In certain embodiments, the sub-image extraction engine 120 determines the threshold based on processing a set of document image files. In certain embodiments, reversal results in the colors being flipped so that segmentations are white, while the background is black. That is, the foreground content (e.g., text, sub-images, table lines, etc.) becomes white after reversal. In certain embodiments, the operations of block 204 include segmentation. Segmentation may be described as partitioning a document image file into multiple segments (sets of pixels). In certain embodiments, the reversal of color turns text and other foreground content from one color (e.g., black) to another color (e.g., white) in segments, and then embodiments further process these segments. In certain embodiments, background content is filtered out by turning them from a one color (e.g., white) to another color (e.g., black).

In block 206, the sub-image extraction engine 120 creates a first image file with solid horizontal lines and a second image file with solid vertical lines. In particular, the sub-image extraction engine 120 looks for the solid (e.g., not dashed or dotted) horizontal lines and vertical lines that indicate that segments that do not have text. With document image files, when drawing horizontal or vertical lines across the text area, the lines are non-solid lines (e.g., dotted lines). That is, the text is formed with dotted horizontal lines and dotted vertical lines. Thus, in certain embodiments, the operations of block 206 filters out text. In certain embodiments, the solid horizontal lines and solid vertical lines that are next to each other form the sub-image area.

In block 208, the sub-image extraction engine 120 removes solid horizontal lines having a pre-defined height from the solid horizontal lines in the first image file and removes solid vertical lines having a pre-defined width from the solid vertical lines in the second image file. With embodiments, the solid lines that are not part of a sub-image are filtered out on the basis that these solid lines have a short height or a thin width. In certain embodiments, the sub-image extraction engine 120 does not consider width (length) for solid horizontal lines, but the height should be thin enough be to lines (e.g., of a table). In certain embodiments, the sub-image extraction engine 120 does not consider height for solid vertical lines, but the width should be thin enough to be a line (e.g., of a table). In certain embodiments, the pre-defined height is a range of heights (which is configurable), and the pre-defined width is a range of widths (which is configurable). In certain embodiments, the pre-defined height is less than a first threshold (which is configurable), and the pre-defined width is less than a second threshold (which is configurable). From block 208 (FIG. 2A), processing continues to block 210 (FIG. 2B).

In block 210, the sub-image extraction engine 120 adds remaining solid horizontal lines in the first image file and solid vertical lines in the second image file to form a new image file. In certain embodiments, the adding the remaining solid horizontal lines and solid vertical lines may be described as merging the first image file and the second image file so that the first image file and the second image file overlap, and the remaining solid horizontal lines and solid vertical lines form the new image file.

In block 212, the sub-image extraction engine 120 identifies the sub-image formed by the added solid horizontal lines and the solid vertical lines in the new image file. That is, once the solid horizontal lines and solid vertical lines are removed based on height and width, the remaining solid horizontal lines and solid vertical lines are merged to restore the sub-image area.

In block 214, the sub-image extraction engine 120 extracts a segment that includes the sub-image. In certain embodiments, the sub-image extraction engine 120 uses edge detection to extract the segment around the sub-image area. This uses image processing technologies to find the edges of the sub-image and extracts the sub-image. The segment may include some space around the sub-image. In certain embodiments, the segment that includes the sub-image is extracted from the new image file. In certain other embodiments, the segment that includes the sub-image is extracted from the original document image file (received in block 200) based on information (e.g., location information) from identifying the sub-image.

In block 216, the sub-image extraction engine 120 performs post-processing on the segment that includes the sub-image. In certain embodiments, the sub-image extraction engine 120 passes the segment that includes the sub-image to one of multiple post-processors based on a business need. In certain embodiments, the sub-image extraction engine 120 stores the segment that includes the sub-image in a database, re-uses the segment that includes the sub-image (e.g., by inserting that segment that includes the sub-image into another document image file), modifies the segment that includes the sub-image, re-uses the modified segment that includes the sub-image (e.g., by inserting that modified segment that includes the sub-image into the original document image file or another document image file), etc. In certain embodiments, the sub-image extraction engine 120 performs post-processing on the segment that includes the sub-image to obtain additional information or useful information.

In certain embodiments, the processing of FIGS. 2A and 2B may find multiple sub-images in a document image file.

Figure 3:
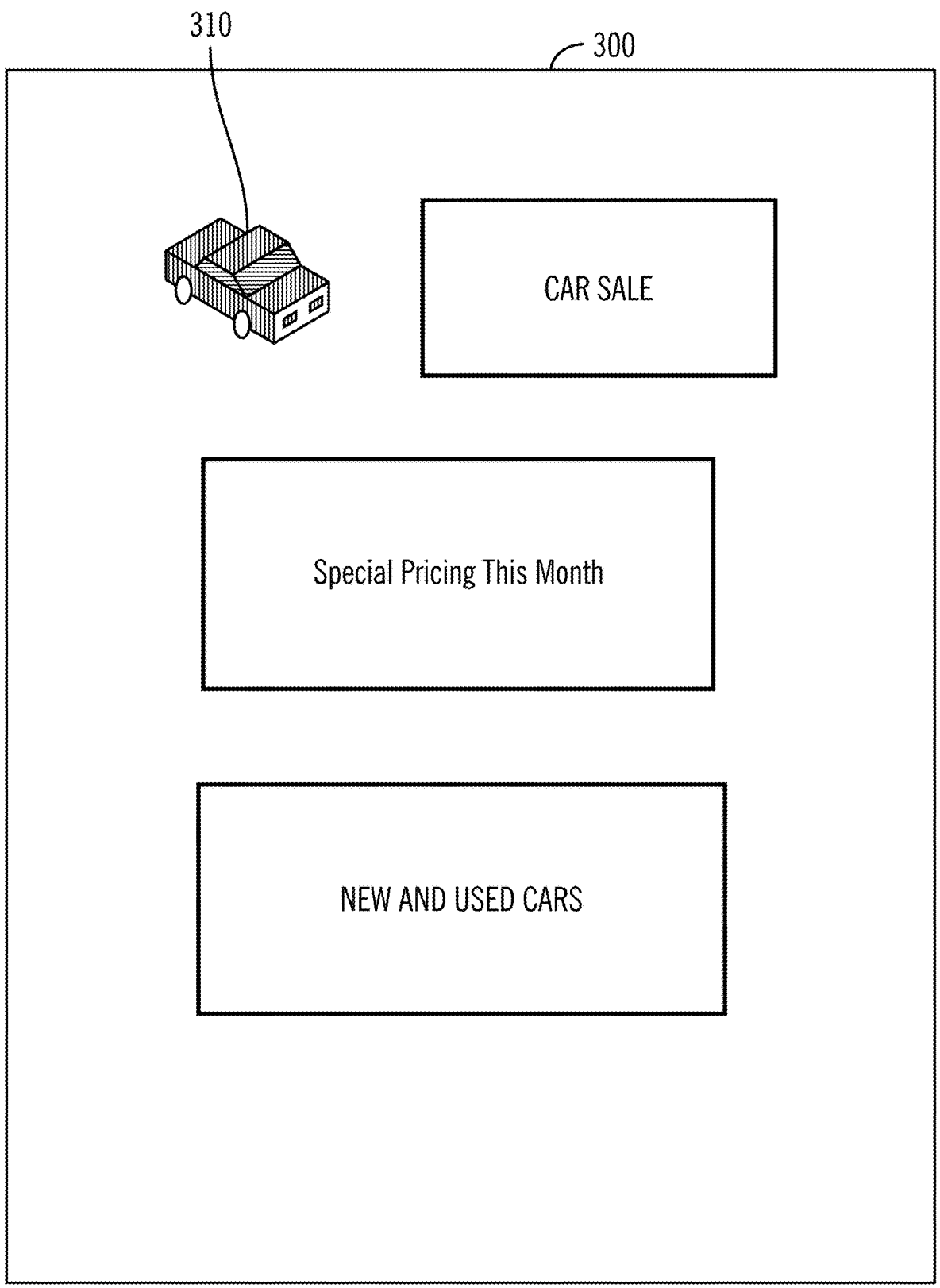
FIG. 3 illustrates an example document image file in accordance with certain embodiments.

Merely to enhance understanding of embodiments, an example is provided below. In the examples of FIGS. 3-9, the background is initially white, while text, solid horizontal lines, and solid vertical lines are initially black. Also, the sub-image is in a different color than black, white or gray (e.g., blue, red, etc.). FIG. 3 illustrates an example document image file 300 in accordance with certain embodiments. The document image file 300 includes a sub-image 310 and text. The sub-image 310 is shown filled in with lines, however, the sub-image 310 may be in a different color than black, white or gray (e.g., blue, red, etc.).

Figure 4:
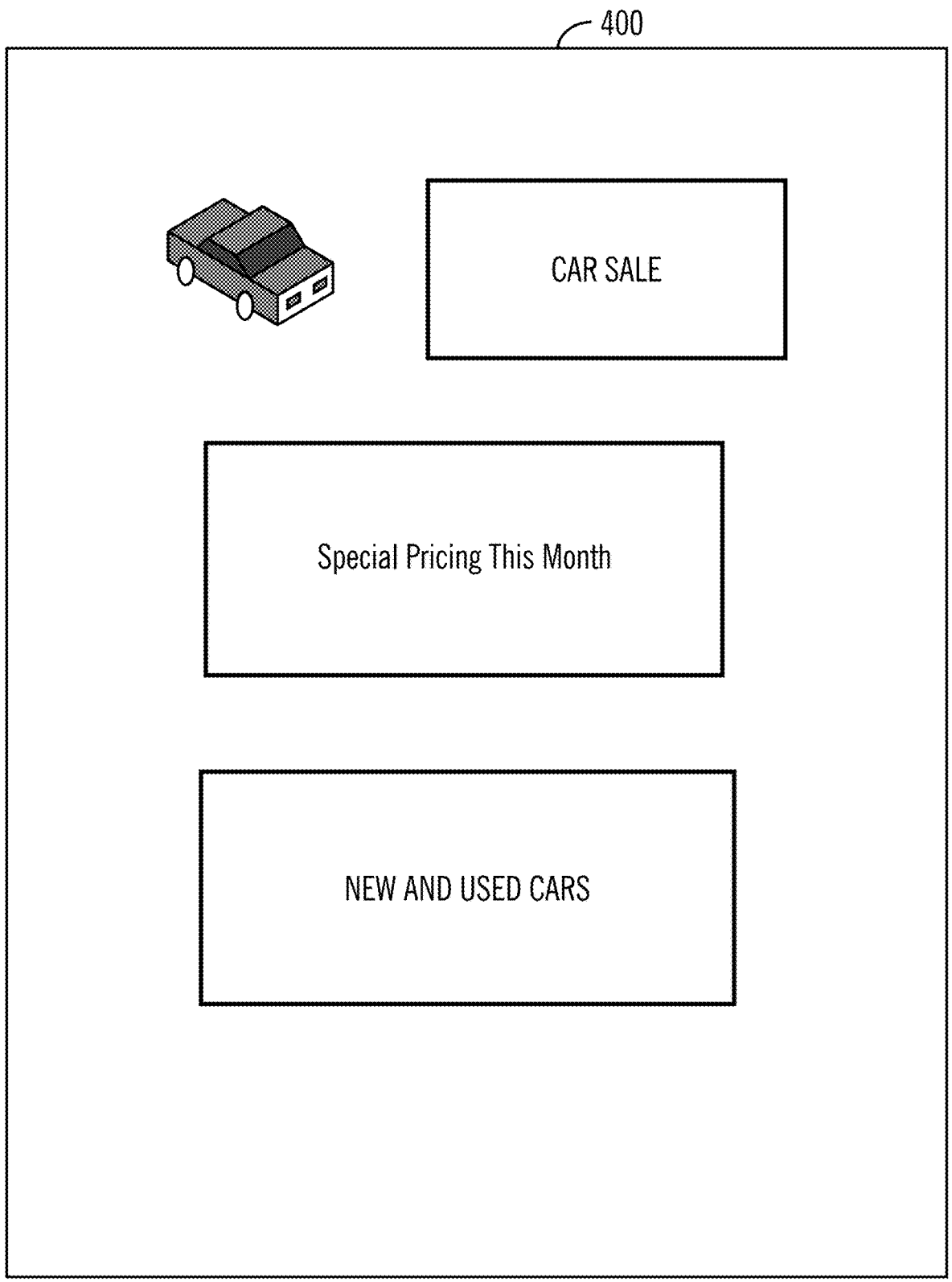
FIG. 4 illustrates a grayed out document image file in accordance with certain embodiments.

FIG. 4 illustrates a grayed out document image file 400 in accordance with certain embodiments. That is, the sub-image extraction engine 120 greys out the document image file 300 so that the document image file 400 contains black, white, and different levels of grey.

Figure 5:
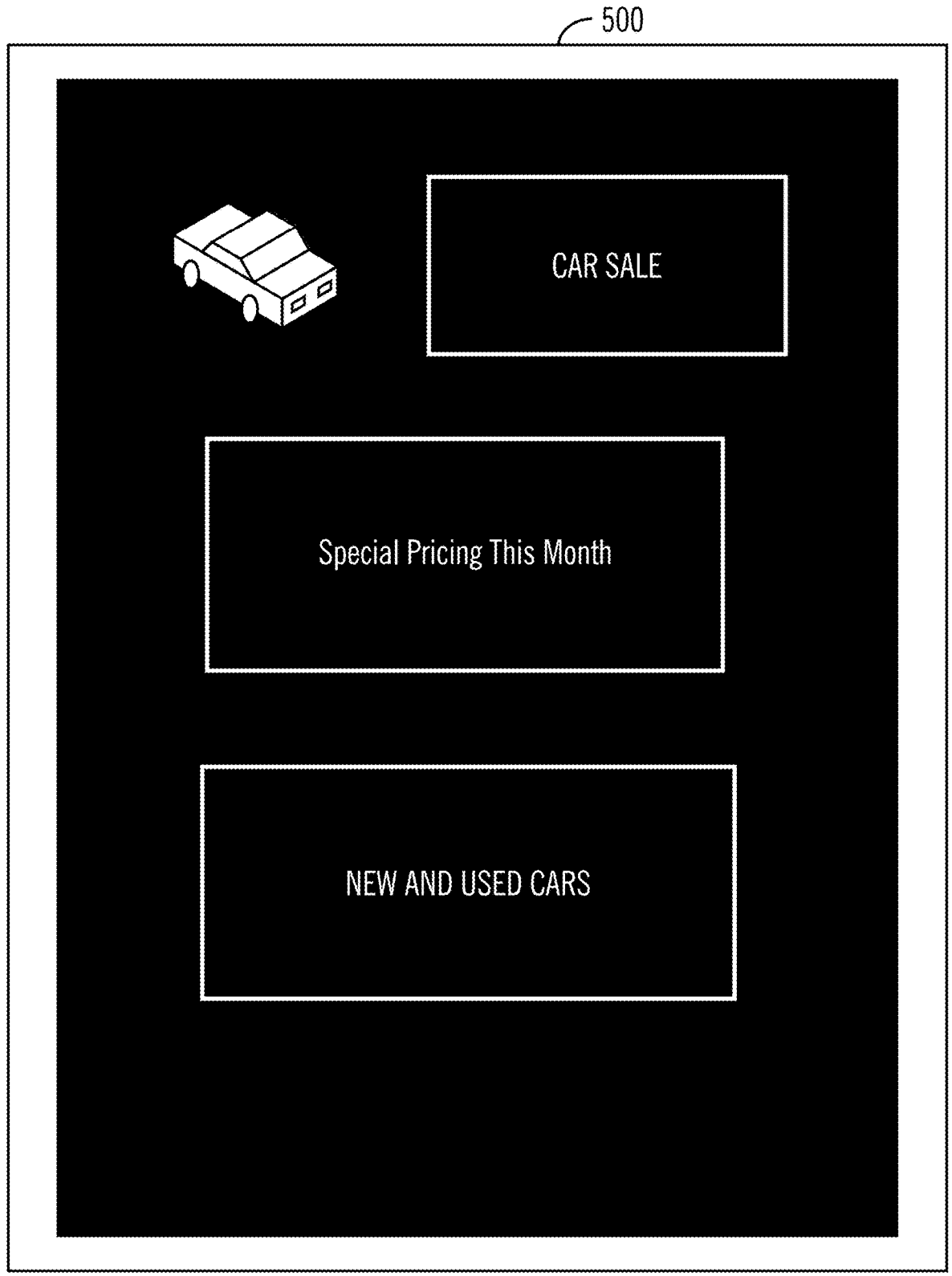
FIG. 5 illustrates reversing color of a document image file in accordance with certain embodiments.

FIG. 5 illustrates reversing the color of the document image file 500 in accordance with certain embodiments. Comparing FIG. 4 to FIG. 5, it can be seen that the sub-image and the text, which were originally black or grey, are now white. That is, the sub-image extraction engine 120 reverses black to white, reverses white to black, and determines that gray of the sub-image is closer to black based on a threshold and reverses the gray to white.

Figure 6:
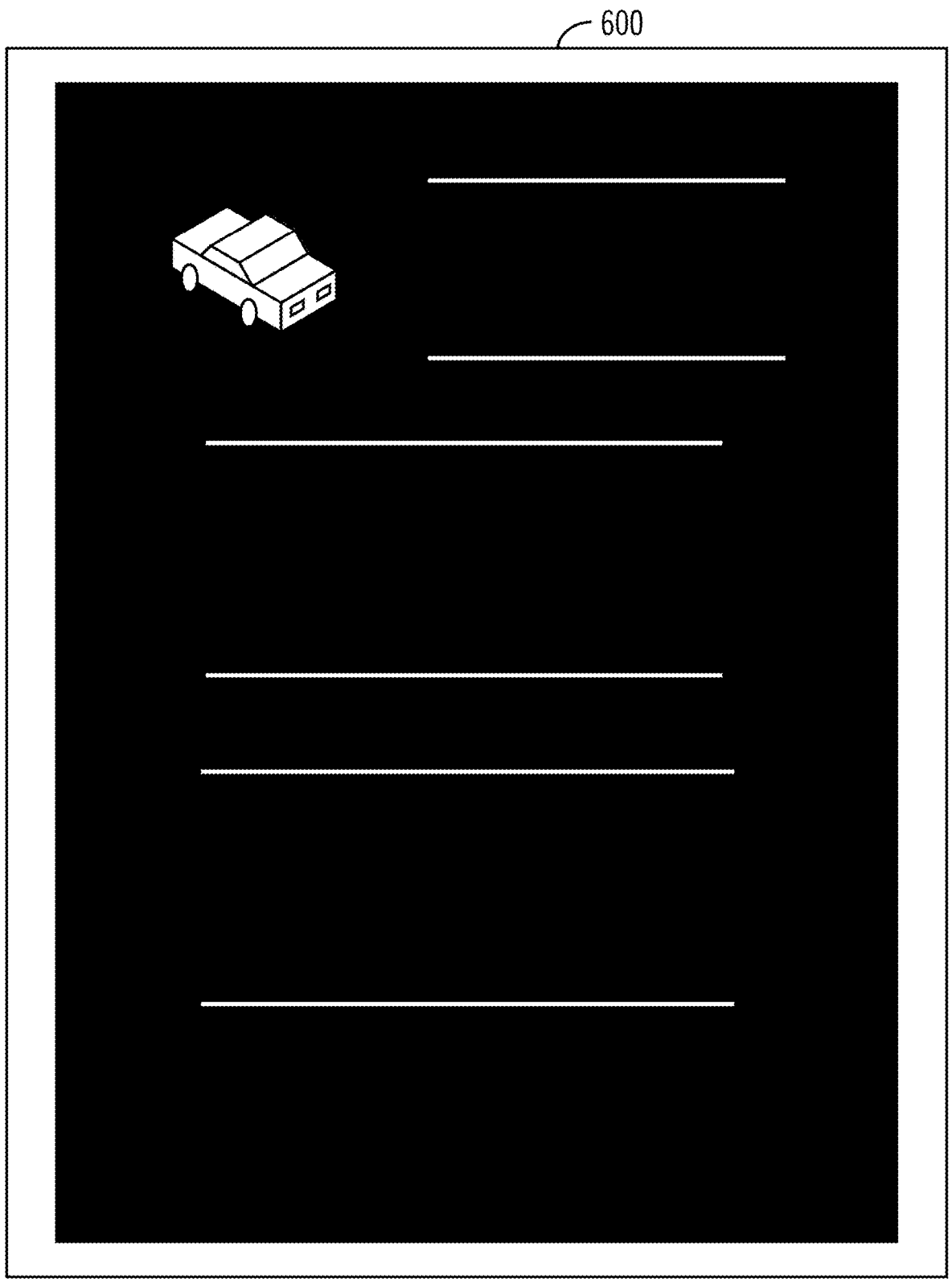
FIG. 6 illustrates finding solid horizontal lines in a document image file in accordance with certain embodiments.

FIG. 6 illustrates finding solid horizontal lines in the document image file 600 in accordance with certain embodiments. Comparing FIG. 3 to FIG. 6, it can be seen that the solid horizontal lines of the document image file 600 are part of the sub-image or are solid lines outlining text in the document image file 300. That is, the sub-image extraction engine 120 creates the document image file 600 with solid horizontal lines.

Figure 7:
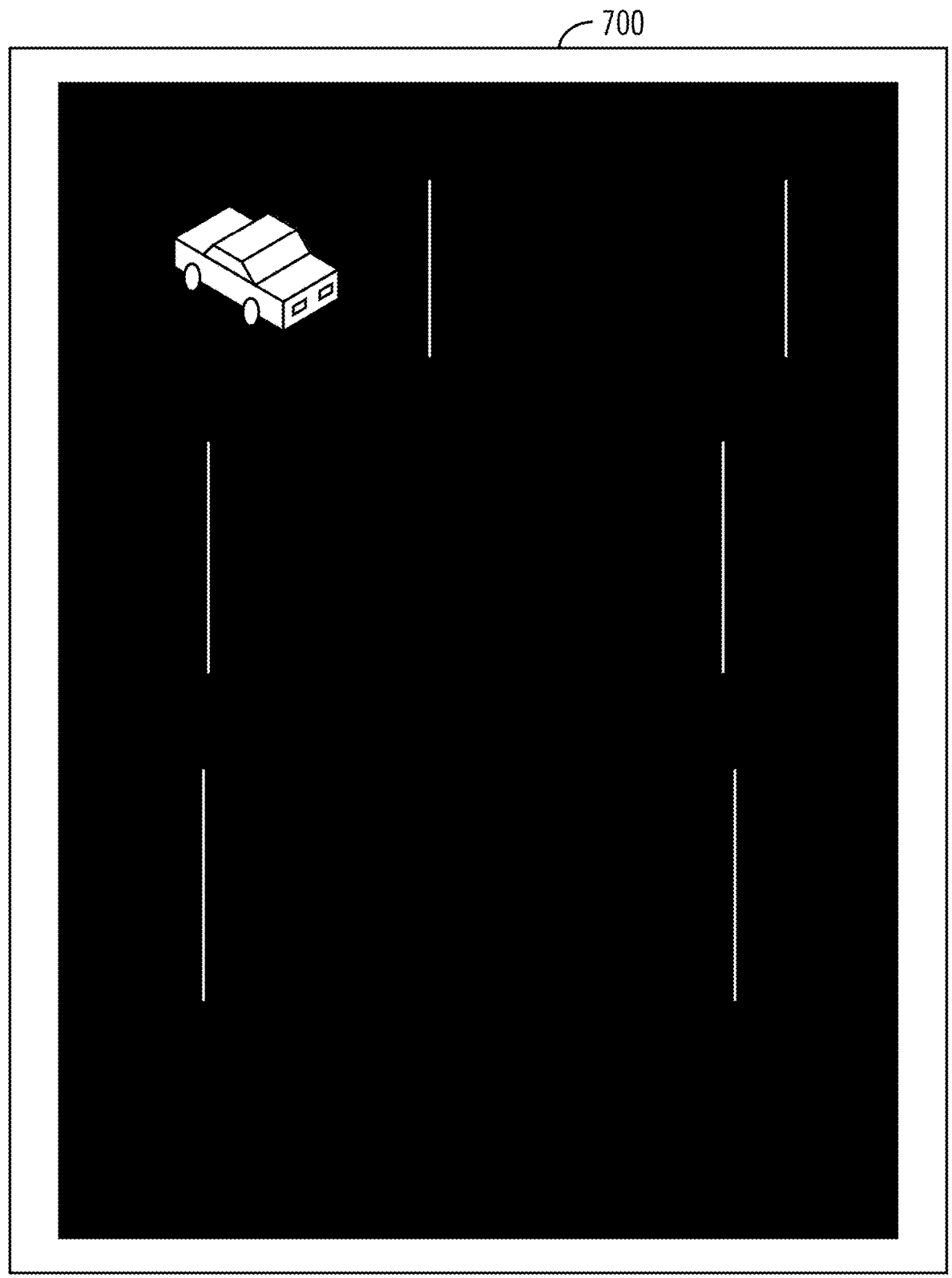
FIG. 7 illustrates finding solid vertical lines in a document image file accordance with certain embodiments.

FIG. 7 illustrates finding solid vertical lines in the document image file 700 accordance with certain embodiments. Comparing FIG. 3 to FIG. 7, it can be seen that the solid vertical lines of the document image file 700 are part of the sub-image or are solid lines outlining text in the document image file 300. That is, the sub-image extraction engine 120 creates the document image file 700 with solid vertical lines.

Figure 8:
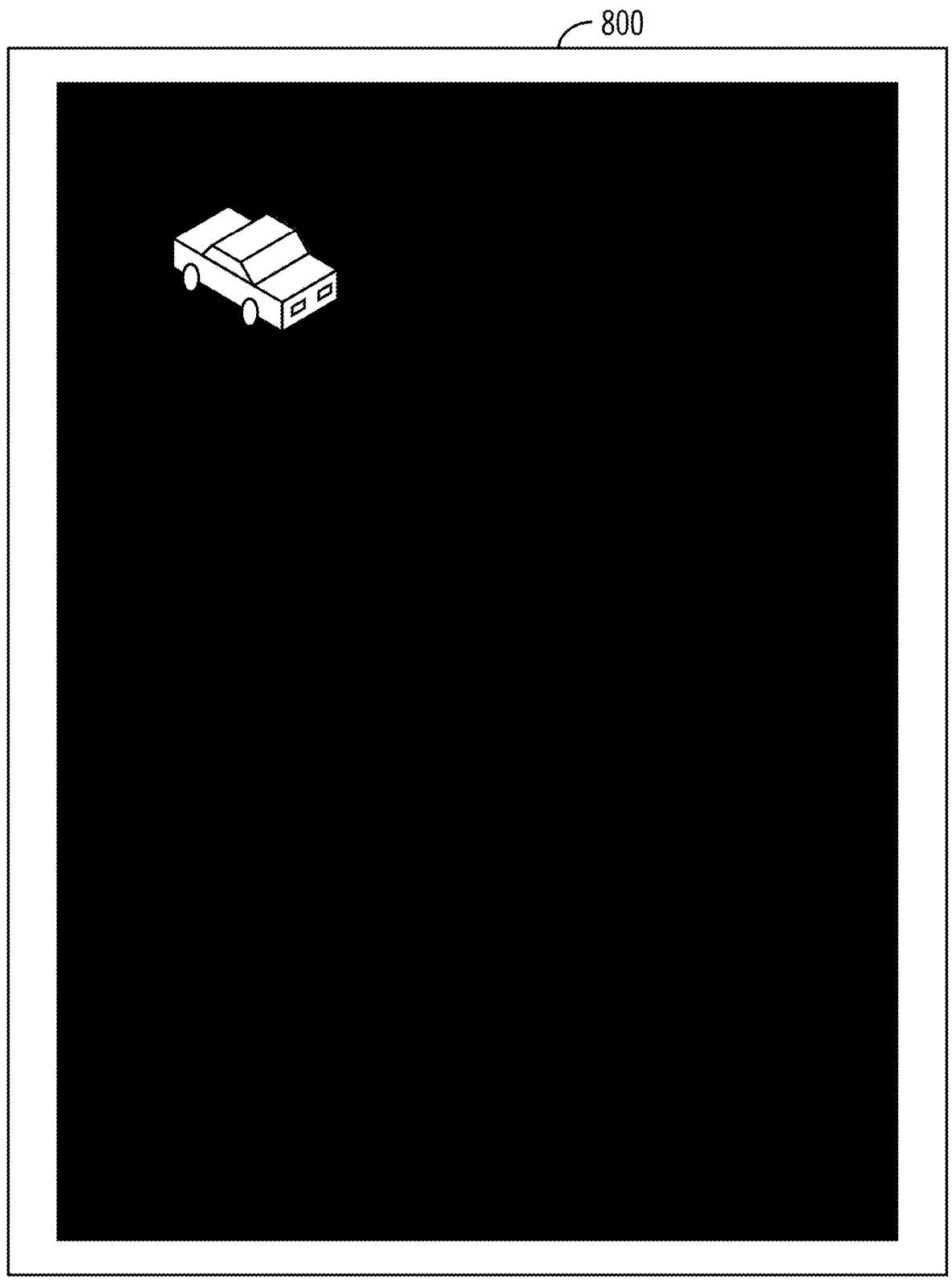
FIG. 8 illustrates removal of solid horizontal lines and solid vertical lines around text in a document image file in accordance with certain embodiments.

FIG. 8 illustrates removal of solid horizontal lines and solid vertical lines around text in a document image file 800 in accordance with certain embodiments. Compared with FIGS. 6 and 7, it can be seen that the solid horizontal lines and solid vertical lines that were around text (in FIG. 3) have been removed in the document image file 800. That is, the sub-image extraction engine 120 removes solid horizontal lines having a pre-defined height from the solid horizontal lines in the document image file 600 and removes solid vertical lines having a pre-defined width from the solid vertical lines in the document image file 700. Then, the sub-image extraction engine 120 adds remaining solid horizontal lines in the document image file 600 and solid vertical lines in the document image file 700 to form the document image file 800, which contains the sub-image. In certain embodiments, the sub-image extraction engine 120 identifies the sub-image formed by the added solid horizontal lines and the solid vertical lines in the document image file 800 and extracts a segment that includes the sub-image.

Figure 9:
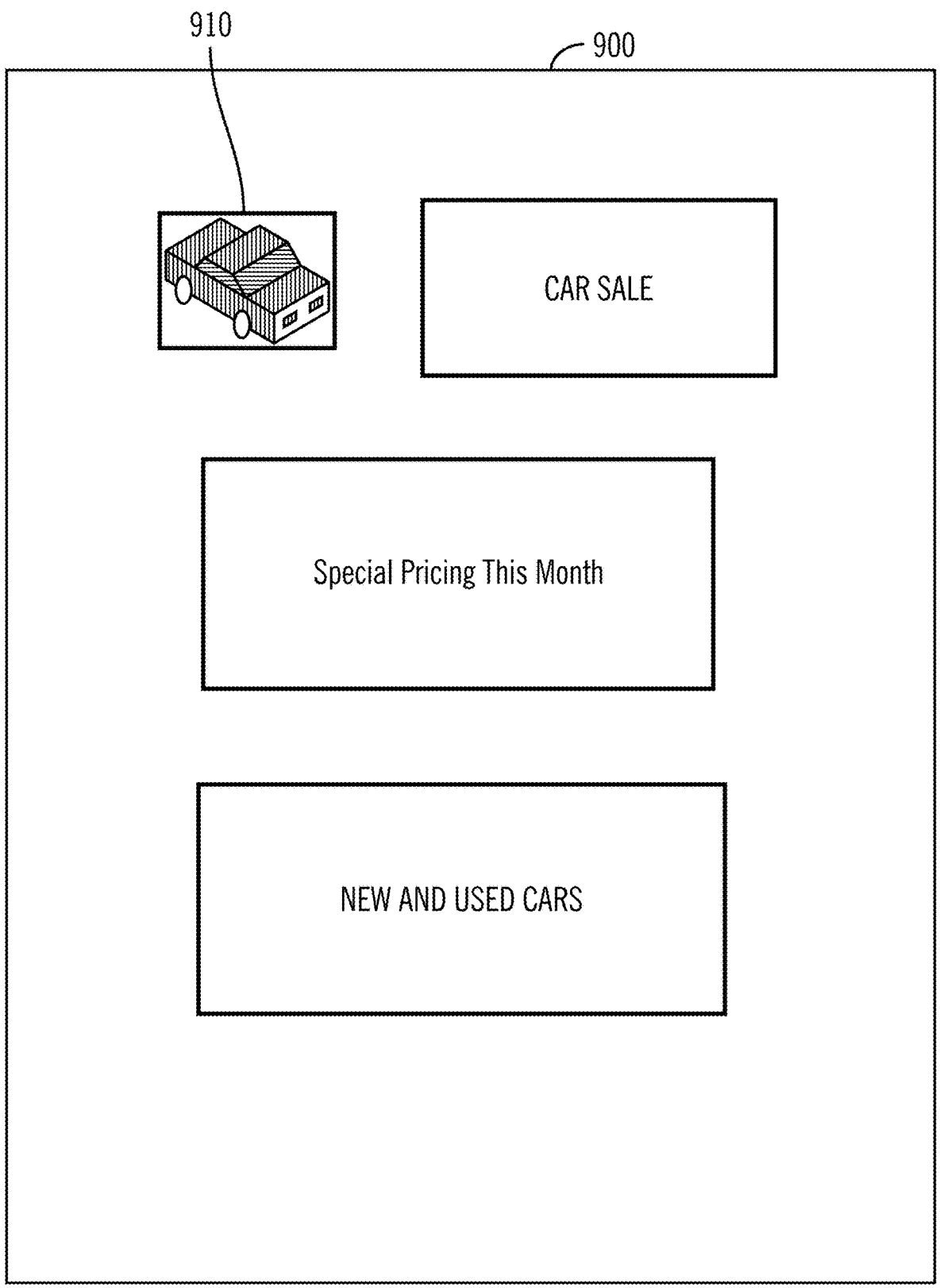
FIG. 9 illustrates identification of a sub-image in a document image file in accordance with certain embodiments.

FIG. 9 illustrates identification of the sub-image 910 in the document image file 900 in accordance with certain embodiments. In certain embodiments, the sub-image extraction engine 120 identifies the sub-image in the document image file 900 (which includes the text, etc. of FIG. 3) and extracts a segment that includes the sub-image. The sub-image extraction engine 120 may perform post-processing on the segment that includes the sub-image.

Embodiments identify and extract sub-images from document image files and pass to some post-processors to extract useful information. Unlike image processing technologies that identify segmentations (busy areas) for a document image file, embodiments differentiate a sub-image in the document image file that may also include a text area.

Thus, embodiments identify a sub-image (e.g., a company logo or an image related to text) in a document image file (such as invoices, medical claims, contracts, etc.) by using image processing technologies to process the document image file and extract useful information. Embodiments process the document image file to gray out the image, after which the image contains black, white and different level of gray colors. Embodiments set a threshold to reverse the color of the image so that busy areas (e.g., text, solid lines, and sub-images) become white, while the background becomes black. The solid horizontal lines and solid vertical lines in the image are located that are not part of the sub-image and are removed. The remaining horizontal lines and vertical lines form the sub-image. The, embodiments extract a segment that includes the sub-image using image processing technologies and perform post-processing on the segment that includes the sub-image to obtain additional information or useful information.

Figure 10:
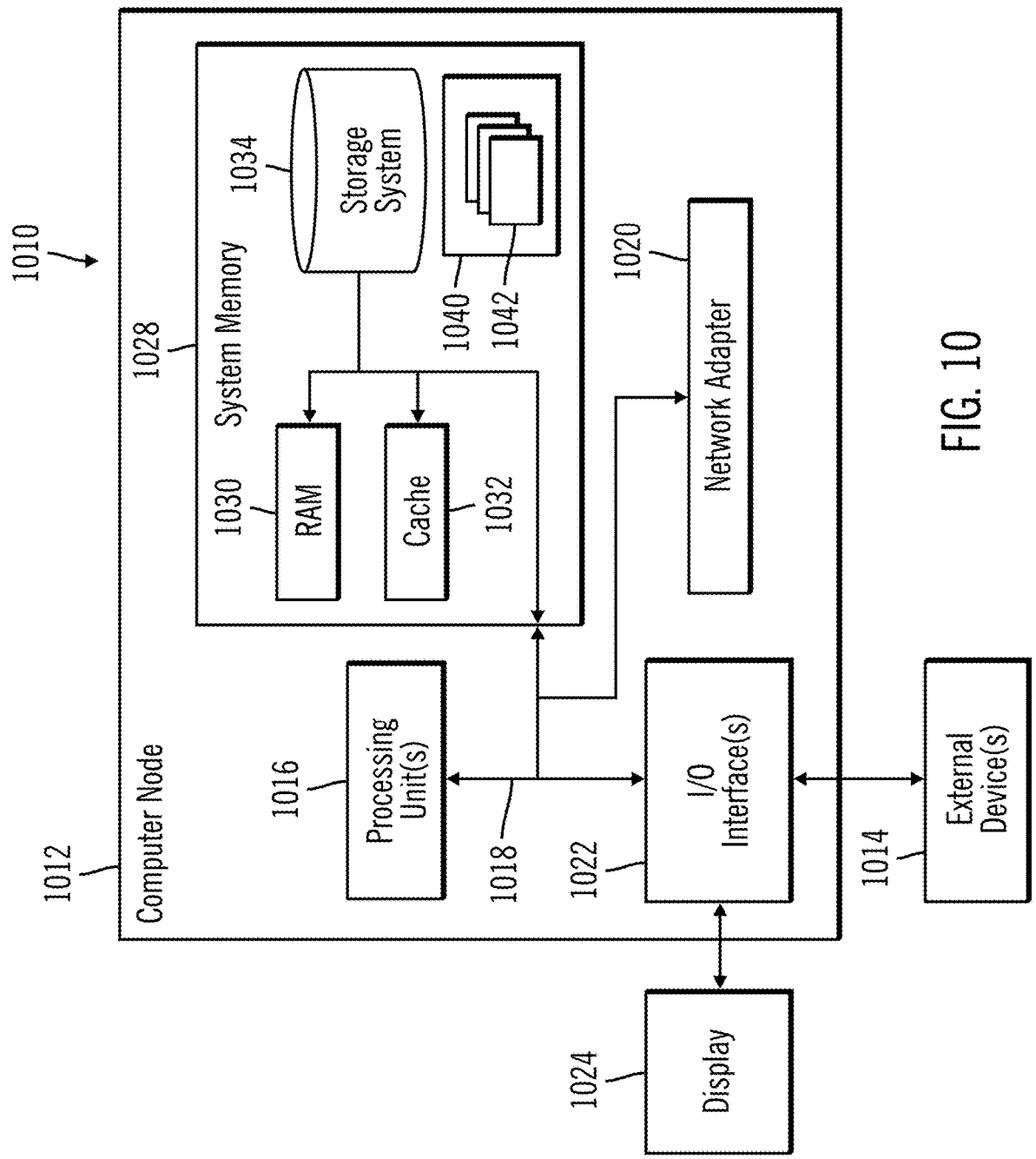
FIG. 10 illustrates a computing node in accordance with certain embodiments.

FIG. 10 illustrates a computing environment 1010 in accordance with certain embodiments. In certain embodiments, the computing environment is a cloud computing environment. Referring to FIG. 10, computer node 1012 is only one example of a suitable computing node and is not intended to suggest any limitation as to the scope of use or functionality of embodiments of the invention described herein. Regardless, computer node 1012 is capable of being implemented and/or performing any of the functionality set forth hereinabove.

The computer node 1012 may be a computer system, which is operational with numerous other general purpose or special purpose computing system environments or configurations. Examples of well-known computing systems, environments, and/or configurations that may be suitable for use with computer node 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1012 may be described in the general context of computer system executable instructions, such as program modules, being executed by a computer system. Generally, program modules may include routines, programs, objects, components, logic, data structures, and so on that perform particular tasks or implement particular abstract data types. Computer node 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer node 1012 is shown in the form of a general-purpose computing device. The components of computer node 1012 may include, but are not limited to, one or more processors or processing units 1016, a system memory 1028, and a bus 1018 that couples various system components including system memory 1028 to one or more processors or processing units 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1012 typically includes a variety of computer system readable media. Such media may be any available media that is accessible by computer node 1012, and it includes both volatile and non-volatile media, removable and non-removable media.

System memory 1028 can include computer system readable media in the form of volatile memory, such as random access memory (RAM) 1030 and/or cache memory 1032. Computer node 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, system memory 1028 may include at least one program product having a set (e.g., at least one) of program modules that are configured to carry out the functions of embodiments of the invention.

Program/utility 1040, having a set (at least one) of program modules 1042, may be stored in system memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer node 1012 may also communicate with one or more external devices 1014 such as a keyboard, a pointing device, a display 1024, etc.; one or more devices that enable a user to interact with computer node 1012; and/or any devices (e.g., network card, modem, etc.) that enable computer node 1012 to communicate with one or more other computing devices. Such communication can occur via Input/Output (I/O) interfaces 1022. Still yet, computer node 1012 can communicate with one or more networks such as a local area network (LAN), a general wide area network (WAN), and/or a public network (e.g., the Internet) via network adapter 1020. As depicted, network adapter 1020 communicates with the other components of computer node 1012 via bus 1018. It should be understood that although not shown, other hardware and/or software components could be used in conjunction with computer node 1012. Examples, include, but are not limited to: microcode, device drivers, redundant processing units, external disk drive arrays, RAID systems, tape drives, and data archival storage systems, etc.

In certain embodiments, the computing device 100 has the architecture of computer node 1012. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
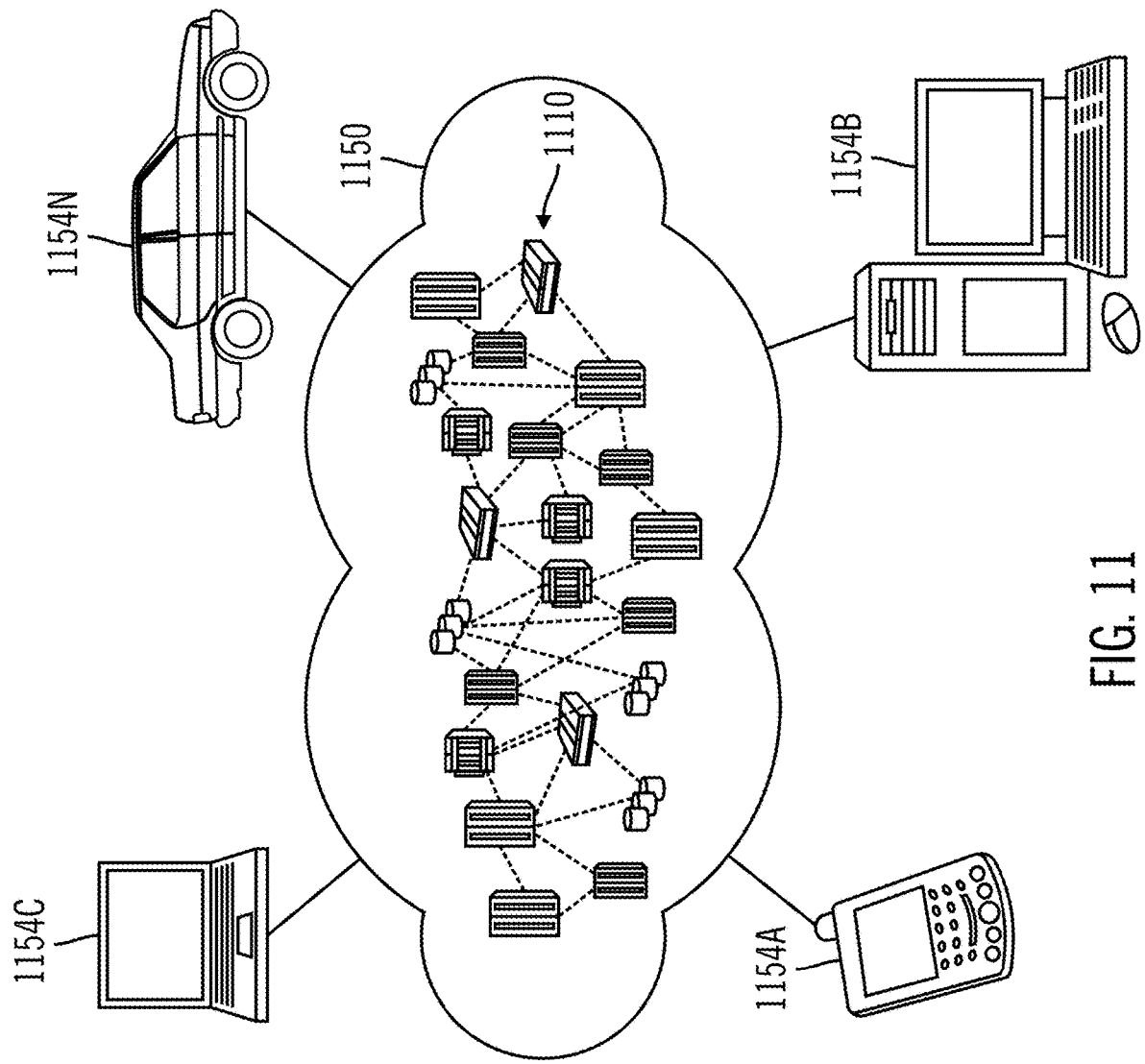
FIG. 11 illustrates a cloud computing environment in accordance with certain embodiments.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
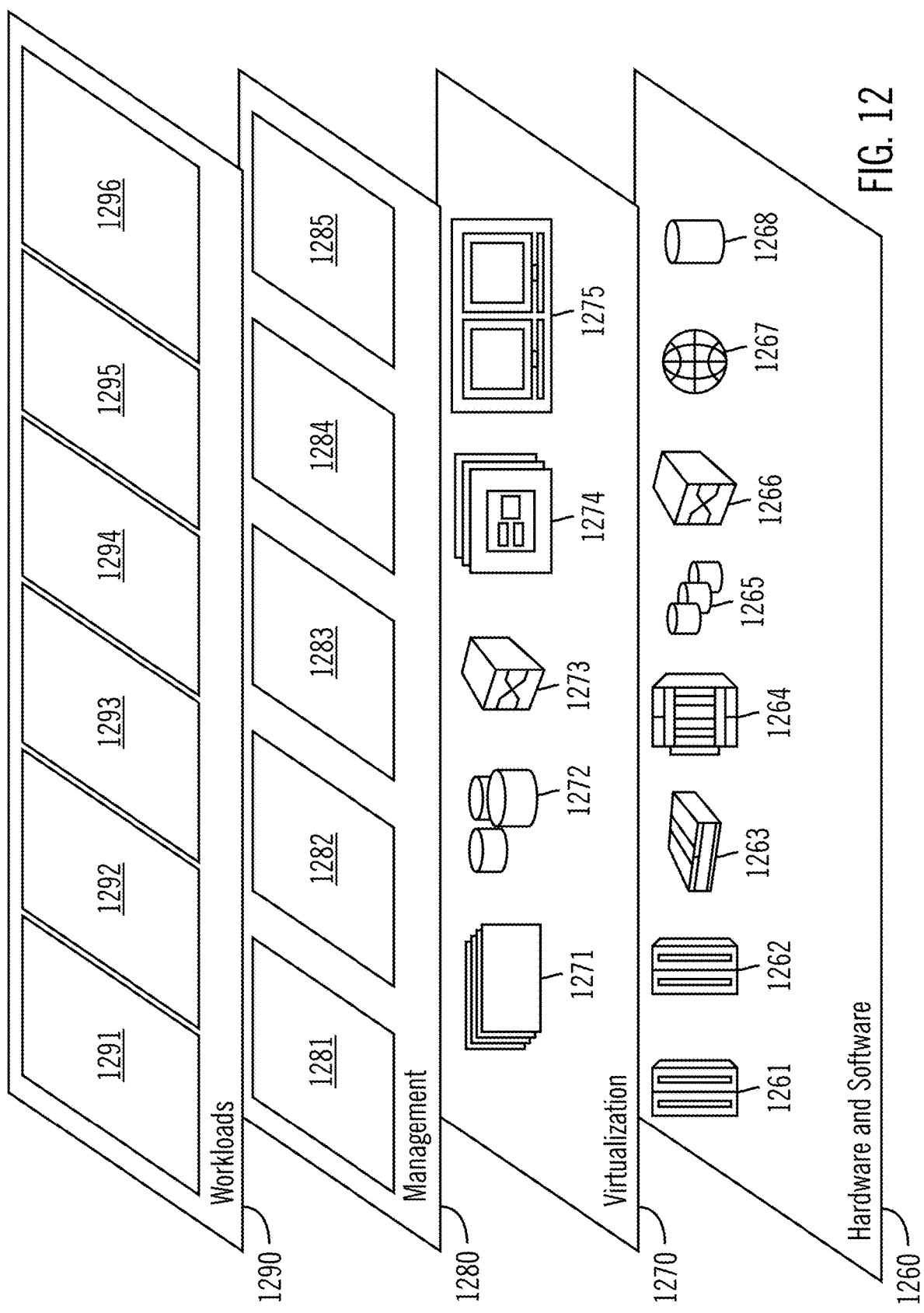
FIG. 12 illustrates abstraction model layers in accordance with certain embodiments.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and identifying and extracting a sub-image in a document image file 1296

Thus, in certain embodiments, software or a program, implementing identifying and extracting a sub-image in a document image file in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:
1. A computer-implemented method, comprising:
modifying colors in a document image file to form a modified document image file, wherein the document image file contains a first color, a second color, and a third color, wherein a threshold is used to determine whether each of different levels of the third color is to be one of the first color and the second color;
creating a first image file with solid horizontal lines and a second image file with solid vertical lines from the modified document image file;

removing the solid horizontal lines from the first image file having a pre-defined width and the solid vertical lines from the second image file having a pre-defined height;

adding remaining solid horizontal lines in the first image file and remaining solid vertical lines in the second image file in a new image file;

identifying a sub-image in the new image file based on the remaining solid horizontal lines and the remaining solid vertical lines;

extracting a segment that includes the sub-image; and performing post-processing on the segment.

2. The computer-implemented method of claim 1, wherein the first color is white, wherein the second color is black, and wherein the third color is grey.

3. The computer-implemented method of claim 1, wherein edge detection is used to extract the segment.

4. The computer-implemented method of claim 1, wherein the post-processing includes any of storing the segment in a database, re-using the segment, modifying the segment, and re-using the modified segment.

5. The computer-implemented method of claim 1, wherein a Software as a Service (SaaS) is configured to perform method operations.

6. A computer program product, the computer program product comprising a computer readable storage medium having program code embodied therewith, the program code executable by at least one processor to perform operations comprising:

modifying colors in a document image file to form a modified document image file, wherein the document image file contains a first color, a second color, and a third color, wherein a threshold is used to determine whether each of different levels of the third color is to be one of the first color and the second color;

creating a first image file with solid horizontal lines and a second image file with solid vertical lines from the modified document image file;

removing the solid horizontal lines from the first image file having a pre-defined width and the solid vertical lines from the second image file having a pre-defined height;

adding remaining solid horizontal lines in the first image file and remaining solid vertical lines in the second image file in a new image file;

identifying a sub-image in the new image file based on the remaining solid horizontal lines and the remaining solid vertical lines;

extracting a segment that includes the sub-image; and performing post-processing on the segment.

7. The computer program product of claim 6, wherein the first color is white, wherein the second color is black, and wherein the third color is grey.

8. The computer program product of claim 6, wherein edge detection is used to extract the segment.

9. The computer program product of claim 6, wherein the post-processing includes any of storing the segment in a database, re-using the segment, modifying the segment, and re-using the modified segment.

10. The computer program product of claim 6, wherein a Software as a Service (SaaS) is configured to perform computer program product operations.

11. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

modifying colors in a document image file to form a modified document image file, wherein the document image file contains a first color, a second color, and a third color, wherein a threshold is used to determine whether each of different levels of the third color is to be one of the first color and the second color;

creating a first image file with solid horizontal lines and a second image file with solid vertical lines from the modified document image file;

removing the solid horizontal lines from the first image file having a pre-defined width and the solid vertical lines from the second image file having a pre-defined height;

adding remaining solid horizontal lines in the first image file and remaining solid vertical lines in the second image file in a new image file;

identifying a sub-image in the new image file based on the remaining solid horizontal lines and the remaining solid vertical lines;

extracting a segment that includes the sub-image; and performing post-processing on the segment.

12. The computer system of claim 11, wherein the first color is white, wherein the second color is black, and wherein the third color is grey.

13. The computer system of claim 11, wherein edge detection is used to extract the segment.

14. The computer system of claim 11, wherein the post-processing includes any of storing the segment in a database, re-using the segment, modifying the segment, and re-using the modified segment.

15. The computer system of claim 11, wherein a Software as a Service (SaaS) is configured to perform computer system operations.

* * * * *